2,975,212

NEW SULFONYL-UREAS AND PROCESS FOR THEIR PREPARATION

Hans Wagner and Walter Aumüller, Frankfurt am Main, Heinrich Ruschig, Bad Soden (Taunus), and Gerhard Korger, Frankfurt am Main, Germany, assignors to Farbwerke Hoechst Aktiengesellschaft vormals Meister Lucius & Brüning, Frankfurt am Main, Hochst, Germany, a company of Germany No Drawing. Filed May 1, 1957, Ser. No. 656,217

Claims priority, application Germany May 26, 1956

6 Claims. (Cl. 260—553)

It is known to provide sulfonyl-ureas of the general formula

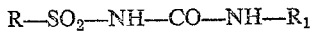

in which R represents a phenyl radical which may contain one or two substituents selected from alkyl and alkoxy residues, of which the alkyl group is preferably of low molecular weight, and halogen atoms, or represents an aliphatic or cycloaliphatic hydrocarbon radical containing three to eight carbon atoms, and $R_1$ represents an aliphatic or cycloaliphatic hydrocarbon radical containing 2 to 8 carbon atoms, as well as the salts thereof and a process for the manufacture of these compounds according to methods as may generally be applied for the manufacture of sulfonyl-ureas. In detail, the following methods are mentioned, for example, as designation for R only alkyl, cycloalkyl- or cyclo-alkyl-alkyl groups being chosen in this connection. These compounds can be produced, for instance, by reacting alkyl-, cycloalkyl- or cycloalkyl-alkyl-sulfonyl isocyanates with alkyl-, alkenyl-, cycloalkyl-, or cycloalkyl-alkyl-amines or by reacting alkyl-, alkenyl-, cycloalkyl- or cycloalkyl-alkyl-isocyanates or such compounds, as in the course of the reaction are converted into such isocyanates, with alkyl-, cycloalkyl-, or cyclo-alkyl-alkyl-sulfonic amides; or by reacting alkyl-, cycloalkyl- or cyclo-alkyl-alkyl-sulfonyl-urethanes with alkyl-, alkenyl-, cycloalkyl- or cyclo-alkyl-alkyl-amines, or alkyl-, alkenyl-, cycloalkyl- or cycloalkyl-alkyl-urethanes with alkyl-, cycloalkyl- or cyclo-alkyl-alkyl-sulfamides; or by reacting alkyl-, alkenyl-, cycloalkyl- or cycloalkyl-alkyl-carbamic acid halides with alkyl-, cycloalkyl- or cyclo-alkyl-alkyl-sulfonic acid amides or alkyl-, cycloalkyl- or cycloalkyl-alkyl-carbamic acid halides with alkyl-, alkenyl-, cycloalkyl- or cycloalkyl-alkyl-amines; or by converting alkyl-, cycloalkyl- or cycloalkyl-alkyl-sulfonyl-ureas which contain less substituents in the amino group, into the corresponding alkyl-, alkenyl-, cycloalkyl- or cyclo-alkyl-alkyl-compounds; or by reacting alkyl-, alkenyl-, cycloalkyl- or cycloalkyl-alkyl-ureas with alkyl-, cycloalkyl- or cycloalkyl-alkyl-sulfonic acid amides; or by reacting corresponding iso-urea ethers, suitably in the form of their salts, with alkyl-, cycloalkyl- or cycloalkyl-alkyl-sulfonic acid halides and subsequently hydrolising the products obtained in this manner; or by desulfurizing the corresponding thio-ureas; or by producing correspondingly substituted guanidines and hydrolising them.

Now we have found that compounds of the general formula

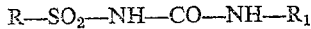

in which R represent an aliphatic or cycloaliphatic hydrocarbon radical containing three to eight carbon atoms, and $R_1$ represents a saturated or unsaturated aliphatic, cyclic or open chained hydrocarbon radical, containing oxygen or sulfur, preferably up to eight carbon atoms, and the salts of these compounds which, in addition to reduced toxicity, are characterized by a high hypoglycemic effect.

The present invention, therefore, relates to the manufacture of such compounds according to processes as are generally applied for the manufacture of sulfonyl ureas. In particular, the following methods according to the invention are mentioned which, in general, are the same as have already been disclosed in the art.

It is, for instance, possible to react alkyl, cycloalkyl- or cycloalkyl-alkyl-sulfonyl-isocyanates with compounds of the formula $R_2$—$NH_2$. It is, however, also possible to obtain the desired ureas in a reverse reaction by reacting compounds of the formula $R_2$—N=C=O, with alkyl-, cycloalkyl- or cycloalkyl-alkyl-sulfonic acid amides. In this connection it is of advantage to use for the reaction with the isocyanates the corresponding aliphatic sulfonic acid amides in the form of their salts, especially in the form of their sodium or potassium salts. Another possibility for producing the novel compounds consists in the fact that alkyl-, cycloalkyl- or cycloalkyl-alkyl-sulfonyl-urethanes can be reacted with compounds of the formula $R_2$—$NH_2$. In many cases the simple heating of the reactants to temperatures above 100° C. causes particularly good yields. When sulfonamides are reacted with ureas containing one aliphatic or cycloaliphatic substituent, it can be of special advantage to use the sulfonamides in the form of their alkali metal salts and the urea derivatives in the form of the corresponding acylated or nitrated compounds and to heat the components in the absence of solvents to elevated temperatures, preferably between 130 and 160° C. For example, the reaction of sulfonic acid halides with iso-urea ethers can be carried out in an aqueous medium in the presence of potassium carbonate, when solid sulfonic acid halides are used. According to an advantageous method of operation of the process the iso-urea ethers are reacted, while cooling, in the form of salts in an aqueous acetonic solution with sulfonic acid halides in the presence of alkali metal hydroxide solutions. The sulfonyl urea ethers precipitating from the solution are filtered off with suction and, if necessary, recrystallized from dilute alcohols. They are heated, for instance, with concentrated acids, preferably hydrochloric acid, to about 60–100°, whereby evolution of gas sets in. According to another method of operation covered by the invention it is possible to use for the desulfurization of the corresponding sulfonyl-thioureas heavy metal oxides in the presence of solvents; in this connection it can be of advantage to use instead of the heavy metal oxides the corresponding metal salts, for instance lead-, copper- or silver-salts. Another usual method for the desulfurization consists in carrying out the oxidation of the sulfonyl-thioureas with, for instance, sodium peroxide or nitrous acid.

Finally, it is possible according to the process of the present invention to hydrolyze also corresponding sulfonyl guanidines which, in known manner, may have been produced by reaction of sulfonyl-cyanamides with a primary amine (cf. French Patent 913,967 and British Patent 595,472) or by reaction of benzene-sulfonic acid chlorides with alkyl-guanidines in the presence of alkali, in which connection it is suitable to heat the sulfonyl guanidines slowly in an aqueous solution with alkali metal hydroxides.

The methods suitable for the manufacture of the products according to the invention can be varied in wide limits as regards the reaction conditions and can be adapted to the conditions prevailing in each case. For instance, in many cases reactions can be carried out by simply heating the components, but also by using solvents, such as acetone, toluene, xylene and chlorobenzene at room temperature or at an elevated temperature. In order to obtain the products in as pure a state as possible, it is advantageous to separate the product thoroughly from the benzene sulfonic acid amides used as starting material or formed in the course of the reaction. Advantageously this is carried out by treating the products with dilute ammonia in which these ureas are relatively readily soluble and reprecipitating them from the solutions by acidification with organic or inorganic acids.

As starting substances there enter into consideration according to the process of the present invention, for instance the following sulfonyl compounds: Alkyl-, cycloalkyl-, alkyl-sulfonamides, which, as alkyl radical, contain for instance a propyl-, butyl-(1)-butyl-(2), 2-methyl-propyl-(1)-, pentyl-(1)-, pentyl-(2)-, pentyl-(3)-, 3-methyl-butyl-(1)-, 2-methyl-butyl-(1)-, hexyl-(1)-, hexyl-(2)-, 4-methyl-pentyl-(2)-, 2-ethyl-butyl-(1)-, heptyl-(1)-, heptyl-(2)-, heptyl-(4)-, 2:4-dimethyl-pentyl-(1)-, 2:4-dimethyl-pentyl-(3)-, actyl-(1)- and actyl-(2)- radical, as cycloalkyl radicals, for instance a cyclohexyl- and cycloheptyl-radical and as cycloalkyl-alkyl-radicals, for instance a cyclo-hexyl-methyl- and cyclohexyl-ethyl-radical. Furthermore, there can be used: Corresponding alkyl-, cycloalkyl- or cycloalkyl- alkyl-sulfonyl-urethanes containing in the urethane component an alkyl radical of low molecular weight, for instance a methyl-, ethyl- or an aryl-radical; furthermore corresponding alkyl-, cyclo-alkyl- or cycloalkyl-alkyl-sulfonyl-isocyanates, sulfonic acid halides, sulfonyl-carbamic acid halides, -sulfonyl ureas-, sulfonyl-thioureas and -sulfonyl guanidines.

Instead of the sulfonyl-isocyanates there can also be used other compounds which, in the course of the reaction behave like isocyanates.

For the reaction with the above-mentioned sulfonyl-isocyanates, or the sulfonyl-urethanes or the sulfonyl-ureas there can be used, according to the invention, the following primary amines: Methoxy-propyl-amine, ethoxy-propyl-amine, propoxy-propyl-amine, propoxy-ethyl-amine, ethoxy-ethyl-amine, ethoxy-ethylene-oxyethyl-amine, methoxy-ethylene-oxy-ethyl-amine, α-tetrahydrofurfuryl-methyl-amine, 6-propyl-dioxane-(1:3)-amine-(4), β,β-diethoxy-ethyl-amine, methyl-mercapto-propyl-amine and ethyl-mercapto-propylamine. Instead of these amines there can be used for the reaction with the above-mentioned sulfonyl compounds the isocyanates, urethanes, ureas or isourea ethers derived from these amines. Instead of such isocyanates other compounds than the above-mentioned can be used which in the course of the reaction react like isocyanates.

The products obtained according to the invention constitute valuable medicaments which are characterized by a high hypoglycemic effect and a very low toxicity. In view of the last mentioned property they are particularly appropriate for oral administration as antidiabetics, since compounds suitable for the treatment of diabetes mellitus in many cases have to be administered for many years. The compounds can be used per se or in the form of their alkali metal salts or in the presence of substances which lead to a salt formation. For the salt formation there can be used, for instance: Alkali metal hydroxides or alkaline earth metal hydroxides, alkali metal carbonates or alkali metal bicarbonates, furthermore physiologically tolerated organic bases.

In animal tests the action on the blood sugar level has been demonstrated, for example, in rabbits. When, for instance, a compound of the invention is administered to normally fed rabbits in a single average dose of 400 m./kilogram in, for instance, a solution rendered alkaline with bicarbonate, a lowering of the blood sugar level sets in rapidly and reaches a maximum of about 30% of the initial value in the course of about 3 to 4 hours. For instance, the mentioned dose of N-(3-methyl-butane-(1)-sulfonyl)-N'-(3'-methoxy-propyl)-urea lowers the blood sugar level by about 30% after 2 hours. The effect is maintained for about 6 hours. When using N-(3-methyl-butane-(1)-sulfonyl) - N'- (3'- ethoxy-propyl)-urea a lowering of the blood sugar level of 20% is reached after 2 hours. After 6 hours the lowering still amounts to 16%. When using N-cyclo-hexanesulfonyl-N'-(3'-methoxy-propyl)-urea the lowering of the blood sugar level amounts to about 30% after 1 hour. This lowering is maintained for more than 6 hours. When using N'-cyclohexylmethanesulfonyl-N'-(3'-methoxy-propyl)-urea, the lowering of the blood sugar level amounts to 40% after 2 hours; after 6 hours it still amounts to 35%.

The blood sugar level can be measured by hourly analyses by the method of Hagedorn-Jensen. The lowering the blood sugar is determined by comparison with the blood sugar level measured on similarly fed, but untreated control animals. It is already known that N-(4-amino-benzene-sulfonyl)-N'-n-butyl-urea exhibits blood sugar lowering properties. It is further known that this compound in view of its sulfanilyl character is also chemotherapeutically active. For its use as an oral antidiabetic which is to be administered for a long period, it is, however, desirable that the compound applied does not show a sulfanilyl character and is, as far as possible, free from other effects in order to exclude damages, for instance of the intestinal flora as well as allergies and the formation of resistance of pathogenic germs against sulfanilyl-amides.

The following examples serve to illustrate the invention but they are not intended to limit it thereto:

EXAMPLE 1

*N - (3' - methyl - butane - (1) - sulfonyl) - N' - (3'-methoxy-propyl)-urea*

31.5 grams of N-(3-methyl-butane-(1)-sulfonyl)-carbamic acid methyl ester (produced from 3-methyl-butane-(1)-sulfonic acid amide and methyl chloro-carbamic acid methyl ester in acetonic solution in the presence of potassium carbonate), 45 grams of xylene and 13.4 grams of 3-methoxy-propylamine are heated to boiling for 6 hours under reflux. After cooling the mixture is shaken out twice with 150 cc. of dilute ammonia each time (1 volume of concentrated ammonia and 20 volumes of water). The combined extracts are treated with charcoal and filtered; the filtration product is acidified with hydrochloric acid. A precipitation of N-(3-methyl-butane-(1)-sulfonyl)-N'-(3'-methoxy-propyl)-urea is obtained in a good yield. The substance is dried, dissolved and allowed to crystallize in ethyl acetate. It melts at 103–105° C.

In an analogous manner the N-(3-methyl-butane-(1)-sulfonyl)-N'(3'-ethoxy-propyl)-urea melting at 74–76° C. is obtained from 31.5 grams of N'-(3'-methyl-butane-(1)-sulfonyl)-carbamic acid methyl ester and 15.5 grams of 3-ethoxy-propyl-amine.

EXAMPLE 2

*N-cyclohexanesulfonyl-N'-(2'-methoxy-ethyl)-urea*

18 grams of 2-methoxy-ethyl-amine are added dropwise at room temperature to a solution of 38 grams of cyclohexanesulfonylisocyanate prepared from cyclohexane-sulfonic acid amide and phosgene in 200 millilitres of absolute benzene. The reaction mixture is boiled for 2 hours under reflux and the solvent is distilled off completely under reduced pressure. The residue is dissolved in 300 cc. of water with the addition of ammonia, the solution is clarified with charcoal and then cautiously acidified with hydrochloric acid. The N-cyclohexane-sulfonyl-N'-(2'-methoxy-ethyl)-urea precipitating in a good yield is filtered with suction, thoroughly washed with water and after drying recrystallized from a mixture of diiso-propyl-ether and methyl-acetate in a proportion of 3:1. Melting point 108–109° C.

In an analogous manner the N-cyclohexanesulfonyl-N'-(3'-methoxy-propyl)-urea is obtained from 25 grams of cyclohexane-sulfonyl-isocyanate and 14 grams of 3-methoxy-propylamine-(1). After recrystallization from acetonitrile the product melts at 129–130° C.

In an analogous manner the N-cyclohexanesulfonyl-N'-tetrahydrofurfuryl-urea is obtained from 38 grams of cyclohexane-sulfonyl-isocyanate and 24 grams of tetrahydrofurfurylamine. After recrystallization from a mixture of diisopropyl-ether and methyl-acetate in a proportion of 4:1 the product melts at 122–123° C.

EXAMPLE 3

*N - (cyclohexylmethanesulfonyl) - N' - (3' - methoxypropyl)-urea*

12 grams of cyclohexylmethane-sulfonyl-carbamic acid methyl ester and 4.5 grams of 3-methoxy-propyl-amine are heated for one hour to 130° C. in the oil bath under slightly reduced pressure. After cooling, the reaction mixture is taken up in an ammonia solution of about 1% strength. The solution obtained is clarified with animal charcoal and after filtration mixed with hydrochloric acid until the reaction is acid to Congo paper. A precipitation of N-(cyclohexylmethane-sulfonyl)-N'-(3'-methoxy-propyl)-urea is obtained which is filtered off with suction and dried. The urea obtained melts after recrystallization from ethyl-acetate at 116–117° C.

EXAMPLE 4

*N-cyclohexanesulfonyl-N-(2'-ethyl-thioethyl)-urea*

17.7 grams of N-cyclohexanesulfonyl-carbamic acid methylester and 8.4 g. of 2-ethylthioethylamine-(1) are mixed together and heated for 45 minutes to 120–140° C. The cooled residue which constitutes a clear melt is recrystallized from 1 litre of methanol of 50% strength. The N-cyclohexanesulfonyl-N' - (2' - ethylthioethyl)-urea melting at 96–98° C. is obtained in a very good yield.

We claim:
1. A compound of the group consisting of sulfonyl ureas of the formula

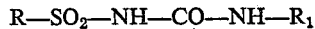

R—SO$_2$—NH—CO—NH—R$_1$ wherein R is a member of the group consisting of alkyl, cycloalkyl and cycloalkylalkyl of 3 to 8 carbon atoms and R$_1$ is a member of the group consisting of straight chain alkoxyalkyl of up to 8 carbon atoms, straight chain alkylthioalkyl of up to 8 carbon atoms and tetrahydrofurfuryl and non-toxic basic salts thereof.

2. The compound of the formula

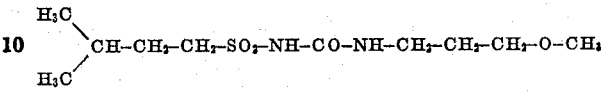

3. The compound of the formula

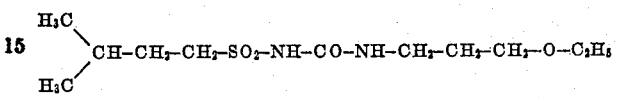

4. The compound of the formula

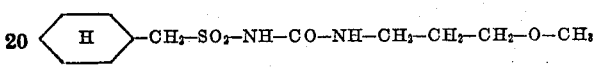

5. The compound of the formula

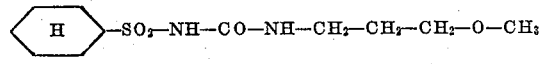

6. The compound of the formula

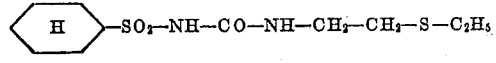

References Cited in the file of this patent
UNITED STATES PATENTS 2,390,253    Henke                 Dec. 4, 1945

FOREIGN PATENTS 70,259    Denmark            Nov. 28, 1949

OTHER REFERENCES

Petersen: Chem. Ber., vol. 83 (1950), pp. 554–557.